(12) United States Patent
Torres et al.

(10) Patent No.: US 11,277,208 B2
(45) Date of Patent: *Mar. 15, 2022

(54) DISTRIBUTION POINT UNIT FOR HIGH SPEED COMMUNICATIONS NODE

(71) Applicant: Methode Electronics, Inc., Chicago, IL (US)

(72) Inventors: Luis Torres, Schaumburg, IL (US); Joseph Llorens, Winfield, IL (US); Alexandros Pirillis, Skokie, IL (US); Robert Skepnek, Norridge, IL (US)

(73) Assignee: Methode Electronics, Inc., Chicago, IL (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/670,917

(22) Filed: Oct. 31, 2019

(65) Prior Publication Data

US 2020/0067605 A1 Feb. 27, 2020

Related U.S. Application Data

(63) Continuation of application No. 15/921,564, filed on Mar. 14, 2018, now Pat. No. 10,530,497.

(51) Int. Cl.
*H04B 10/80* (2013.01)
*H04B 10/27* (2013.01)
(Continued)

(52) U.S. Cl.
CPC ....... *H04B 10/808* (2013.01); *H04B 10/2589* (2020.05); *H04B 10/27* (2013.01);
(Continued)

(58) Field of Classification Search
CPC H04B 10/808; H04B 10/2589; H04B 10/272; H04B 10/27; H04L 12/12; H04Q 1/028; Y02D 30/50
See application file for complete search history.

(56) References Cited

U.S. PATENT DOCUMENTS 7,044,777 B1 5/2006 Daly et al.
8,634,431 B1 1/2014 Chiang et al.
(Continued)

FOREIGN PATENT DOCUMENTS

EP 3054623 A1 10/2016

OTHER PUBLICATIONS http://www.mvmtel.com/efx-14-four-channel-g-fast-onu/ MVM TEL EFX-14 four ports G.FAST ONU/DPU—MINI MSAN (Year: 2016).*
(Continued)

*Primary Examiner* — Leslie C Pascal
(74) *Attorney, Agent, or Firm* — Mahamedi IP Law LLP (57) ABSTRACT

The invention comprises distribution point unit (DPU) including a host for a GPON ONU/ONT module, CPU system-on-chip (SoC) providing a DPU and traffic management, a reverse power harvester and a high speed electrical (HSE) module and the DPU receiving optical signals via the GPON ONU/ONT module and converting to electrical signals and the HSE module transmitting electrical signals via a twisted pair or coaxial cable to a customer premises equipment (CPE) within a home or building and the reverse power harvester receiving power from the HSE module and the GPON ONU/ONT and HSE modules are pluggably mateable to the DPU.

22 Claims, 9 Drawing Sheets

(51) Int. Cl.
*H04Q 1/02* (2006.01)
*H04B 10/272* (2013.01)
*H04L 12/12* (2006.01)
*H04B 10/25* (2013.01)

(52) U.S. Cl.
CPC .......... *H04B 10/272* (2013.01); *H04L 12/12* (2013.01); *H04Q 1/028* (2013.01); *Y02D 30/50* (2020.08)

(56) References Cited

U.S. PATENT DOCUMENTS

| | | | |
|---|---|---|---|
| 10,530,497 B2* | 1/2020 | Torres | H04B 10/272 |
| 2008/0168283 A1 | 7/2008 | Penning | |
| 2009/0060530 A1* | 3/2009 | Biegert | H04L 12/2856 |
| | | | 398/214 |
| 2009/0148157 A1* | 6/2009 | Bernard | H04J 3/1694 |
| | | | 398/25 |
| 2009/0285540 A1 | 11/2009 | Reagan et al. | |
| 2012/0148241 A1 | 6/2012 | Piehler et al. | |
| 2014/0105219 A1* | 4/2014 | Wang | H04L 1/188 |
| | | | 370/412 |
| 2014/0314412 A1 | 10/2014 | Soto et al. | |
| 2015/0050022 A1* | 2/2015 | Loredo, Jr | H04L 12/6418 |
| | | | 398/67 |
| 2016/0164687 A1 | 6/2016 | Cooper | |
| 2016/0330334 A1* | 11/2016 | Cooper | H04M 19/08 |
| 2016/0373358 A1* | 12/2016 | Jain | H04L 47/10 |
| 2017/0250732 A1* | 8/2017 | Bowler et al. | H04B 3/36 |
| 2018/0048739 A1* | 2/2018 | Eddleston | H04L 61/2038 |

OTHER PUBLICATIONS

Report on Implementation of Evolving Telecommunication/ICT Infrastructure for Developing Countries, Jan. 19, 2017; URL https://www.itu.int/en/ITU-D/Technology/Documents/NGN/Report_on_Telecom-ICT_infra_20170117.pdf; pp. 1-99.
SCKiPio Announces World's First Single Port G.Fast DPU Dynamic Time Assignment, Oct. 11, 2016, Ramat Gan, Israel.
Microsemi and SCKiPio Demonstrate World's First G.Fast Reverse Power Feeding at CES, Jan. 5, 2015, International CES, Las Vegas, NV.
Architecture and Requirements for Fiber to the Distribution Point; Issue Date Aug. 24, 2015; Issue 1; Issue Editors: Michael Shaffer and Doug Wei; Copyrighted by The Broadband Forum.
G. Single Fast DPU Channel Product; Data sheet; Published by MVM-EP, 2016.

* cited by examiner

DISTRIBUTION POINT UNIT FOR HIGH SPEED COMMUNICATIONS NODE

The present application is a continuation application from non-provisional application Ser. No. 15/921,564 filed Mar. 14, 2018, which is hereby incorporated by reference.

The invention pertains to a distribution point unit (DPU) for a telecommunications network node for providing a high speed electrical interface (HSE) to a residence or enterprise for connecting to a fiber passive optical network or PON.

BACKGROUND

Telecommunications operators seek the means to deliver Gigabit broadband services (converged voice, video and data) to residential and business customers over existing copper cabling to satisfy the ever increasing demand for higher bandwidth and in response to the competition from cable television (CATV) operators. Providing broadband transmissions in the order of 1 Gbps or greater over existing twisted pair phone line or coaxial cable (coax) copper wiring to multi-dwelling units (MDUs), single-family units (SFUs), enterprises and hospitality suites (hotels and resorts) is a favorable substitute to so called fiber to the home (FTTH) as re-using existing copper cable infrastructure is highly cost effective versus installing fiber all the way to the end-customer. Current DPUs are typically architected with 4-Channels (4CH), 8-Channels (8CH) or more meaning a fixed capital or CAPEX outlay whether all channels native to the equipment are used or not. Furthermore, a 4CH, 8CH, or greater, distribution point unit is typically large and heavy and requires power from a utility service. Collectively these aspects of a typical DPU limit location placement relative to where the broadband service is delivered thus limiting flexibility and ultimately bandwidth performance if the DPU location exceeds approximately 100 m from the residence or business.

Telecommunications operators seek a comprehensive and flexible ecosystem of solutions targeting the delivery of broadband services over existing copper infrastructure. Through the use of pluggable modules, the needs of telecommunications operator for a flexible DPU are realized by modularizing the physical connection interfaces both to the optical access network and the wireline connection out to the end-customer.

SUMMARY

The present invention provides a network demarcation node for terminating a passive optical network (PON) and provides a high-speed electrical (HSE) wireline connection to the end customer over which broadband services can be delivered. The invention in an embodiment comprises a distribution point unit (DPU) providing a host for a PON module that may include the optical network unit (ONU) or optical network terminal (ONT) function and the DPU having a reverse power harvester and a high speed electrical (HSE) module, the DPU receiving optical signals via the PON or PON ONU/ONT pluggable module and converting to electrical signals and the HSE module transmitting electrical signals via copper twisted pair or coaxial cable to a customer premises equipment (CPE) within a residence or enterprise building, the reverse power harvester receiving power from the residence or enterprise via the same copper cable used to deliver broadband service and the PON or PON ONU/ONT and HSE modules are pluggably mateable to the DPU.

The HSE module may comprise one of a G.hn Wave-2, VDSL2, Gfast, Ethernet, 10/100BASE-T, 1000BASE-T and 10GBASE-T. The DPU may be mounted in the vicinity of a curb, on the outside of a residence or multi-dwelling building, in the basement or equipment room of a multi-dwelling unit (MDU) or indeed a variety of outdoor or indoor locations and the DPU shall receive optical input via one of an SC, LC, FC and MU connector plug. The PON module may include a Gigabit PON (GPON) Optical Network Unit (ONU) module and be arranged in a form-factor that is compliant with one of a SFP, SFP+, XFP, QSFP, QSFP+, XEN-PAK, X2, XPAK and XFP multi-source agreement.

In an embodiment the HSE module may be compliant with one of an F-type, coaxial, RJ11, RJ14 and RJ45 connector formats. The HSE module form-factor may be compliant with one of a SFP, SFP+, XFP, QSFP, QSFP+, XEN-PAK, X2, XPAK, and XFP multi-source agreement. The PON pluggable module may comprise one of a GPON, XG-PON, XGS-PON, NG-PON2 that may incorporate a corresponding PON technology system-on-chip (SoC) to collectively serve as an ONU/OLT to terminate the PON fiber link. The HSE is a separate module from the reverse power harvester.

In an embodiment the reverse power harvester may be incorporated within the HSE. The DPU may include modular components including a PON ONU/ONT, a reverse power feed harvester and HSE module. The DPU may be semi-modular. Furthermore, the DPU may be run using a local power DC input as an alternative to reverse power feed. The reverse power feed harvester may receive power from a copper wireline interface connected to the end-customer equipment.

In another embodiment the invention provides a distribution point unit (DPU) comprising a PON or PON ONU/ONT module, a reverse power harvester and a high speed electrical (HSE) module, the DPU receiving optical signals via the PON or PON ONU/ONT module and converting to electrical signals, the HSE module transmitting electrical signals to a customer premises equipment (CPE) within a home or building, the PON or PON ONU/ONT and HSE modules are pluggably mateable to the DPU. The DPU may include a receptacle having a cage for receiving the HSE module that comprises one of a G.hn Wave-2, VDSL2, G.fast, Ethernet, 100BASE-T, 1000BASE-T and 10GBASE-T.

The DPU may be mounted in the vicinity of a curb or a variety of outdoor or indoor locations within the reach capability of the wireline technology implemented in the HSE and the DPU may receive optical input via one of an SC, LC, FC and MU connector plug. The DPU may include a receptacle having a cage for receiving the PON or PON ONU/ONT module that is compliant with one of an SFP, SFP+, XFP, QSFP, QSFP+, XEN-PAK, X2, XPAK and XFP, each compliant with a respective multi-source agreement.

The reverse power feed harvester may have a connection port including one of an RJ-45 receptacle and F-Type plug. Multiple DPUs may be stacked within an enclosure or rack system or clustered together mounted to a flat surface such as a wall providing high speed copper interconnections to customer premises equipment up to and beyond 96 residences of various types. The HSE may provide broadband transmissions of up to and beyond 1 Gbps.

Exemplary embodiments of the present invention will be understood more fully from the detailed description given below and from the accompanying drawings, which, however should not be taken to limit the invention to the specific embodiments depicted, but are for explanation only.

DETAILED DESCRIPTION

An embodiment of the invention is depicted with respect to FIGS. 1-7. In an embodiment the invention provides a distribution point unit (DPU) 100 for a telecommunications network node for providing a high speed electrical interface (HSE) to an enterprise or premises for connecting to a fiber passive optical network (PON). From a functional perspective, the DPU 100 may be considered to serve as a fiber link extender insomuch as the DPU 100 extends the fiber bandwidth of the PON by delivering comparable bandwidth over existing copper wiring such as phone line twisted pair or coaxial cable between HSE to the end customer. The DPU 100 is preferably compact, is industrial temperature rated −40° C. to +85° C., environmentally rugged, providing necessary ingress protection from dust and water, may be reverse powered, low power with a 10 W maximum power budget, modular and stackable, field configurable, provisions processing to, amongst other tasks, run a standard embedded Linux distribution operating system, runs an IPv4/v6 stack, supports phone line crosstalk compensation and may be remotely managed.

Figure 1:
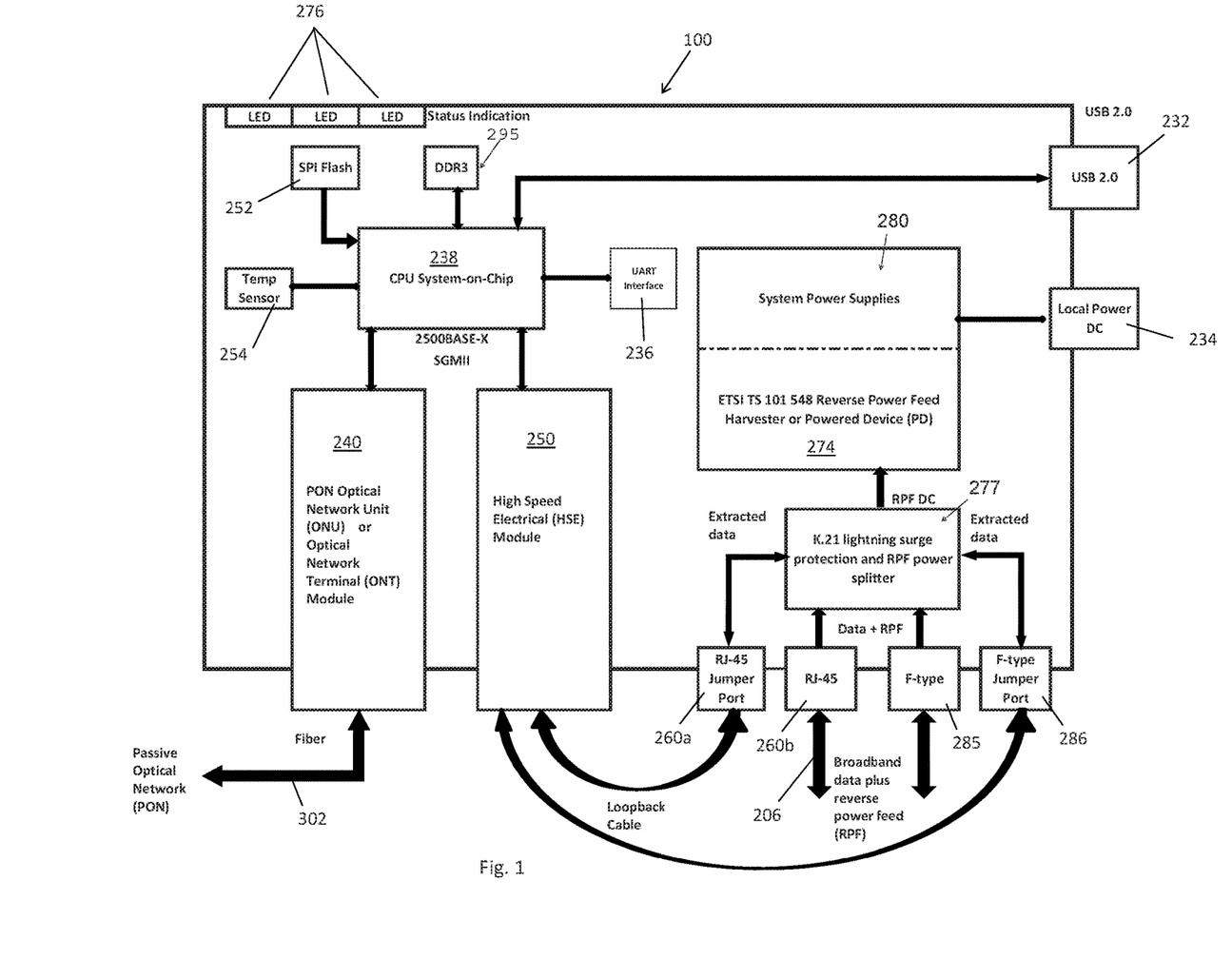
FIG. 1 is a functional block diagram of an embodiment of a DPU of the present invention.

The DPU 100 as depicted in FIG. 1, has the potential to emerge as an important building block for the next generation of so called ultra-fast broadband (UFBB) access networks with converged data speeds up to and in excess of 1 Gbps. A modularized DPU physical layer provides a pluggable transceiver module 240, 250. The DPU 100 serves the purpose to terminate a PON link 240 and manage data transfer between the PON interface and that of the HSE 250 out to the end-customer premises or enterprise. The UFBB wireline technology embedded within the HSE 250 may include G.hn Wave-2, VDSL2, Gfast or Ethernet of various speeds. The DPU serves as a demarcation unit between the PON fiber interface and G.hn Wave-2, VDSL2 or Gfast HSE 250 wireline interface. In an embodiment, the G.hn Wave-2, VDSL2 or Gfast HSE 250 may include the corresponding wireline technology PHY silicon.

The HSE 250 wireline connection will be optimized for copper twisted pair or various types and/or coaxial media 204, 206. The invention may include a high speed electrical interface 232 for local communication between the DPU and a PC with a USB connection via a type-c connector interface. In another embodiment the DPU may reside between the PON network and a residence or enterprise with either a copper twisted pair or coax wireline connection 204 between the two. In an embodiment the DPU may be used for Multi-Dwelling Units (MDU), Single Family Unit (SFU) or Hospitality Suites (e.g. resort and hotel). If local communication to the DPU is needed for the purpose of configuration or debug, then this can be accomplished via USB 2.0 implemented with a Type-C 232 connector. In an alternate embodiment local communication may be via RS232 port 251, given that the installation environment may be considered harsh or industrial. The DPU may include a Wi-Fi hot spot incorporated into the DPU. The DPU can map and transpose data between a PON protocol plane and a high speed electrical plane. The reverse power feed 274 may be received from coaxial cable 285 using a DC injector at premise suitable for delivering power back to the DPU.

In an embodiment, the DPU is a host node and has ports to receive SC fiber optic connectors, RJ-45 or F-Type copper connectors or an SFP cage to receive an SFP transceiver (copper or optical). A passive optical network (PON) for distributing broadband services (converged voice, video and data) may be terminated with the DPU operating using G.hn Wave-2, VDSL2 or Gfast copper wireline technologies for the continued delivery of broadband services to the end customer premises over existing copper cable infrastructure. The DPU may include Layer 2 or Layer 3 switch functionality in order to forward transmissions onto the customer premises equipment (CPE), such as a gateway, and include a unique MAC and configurable IP address for identification.

Figure 2:
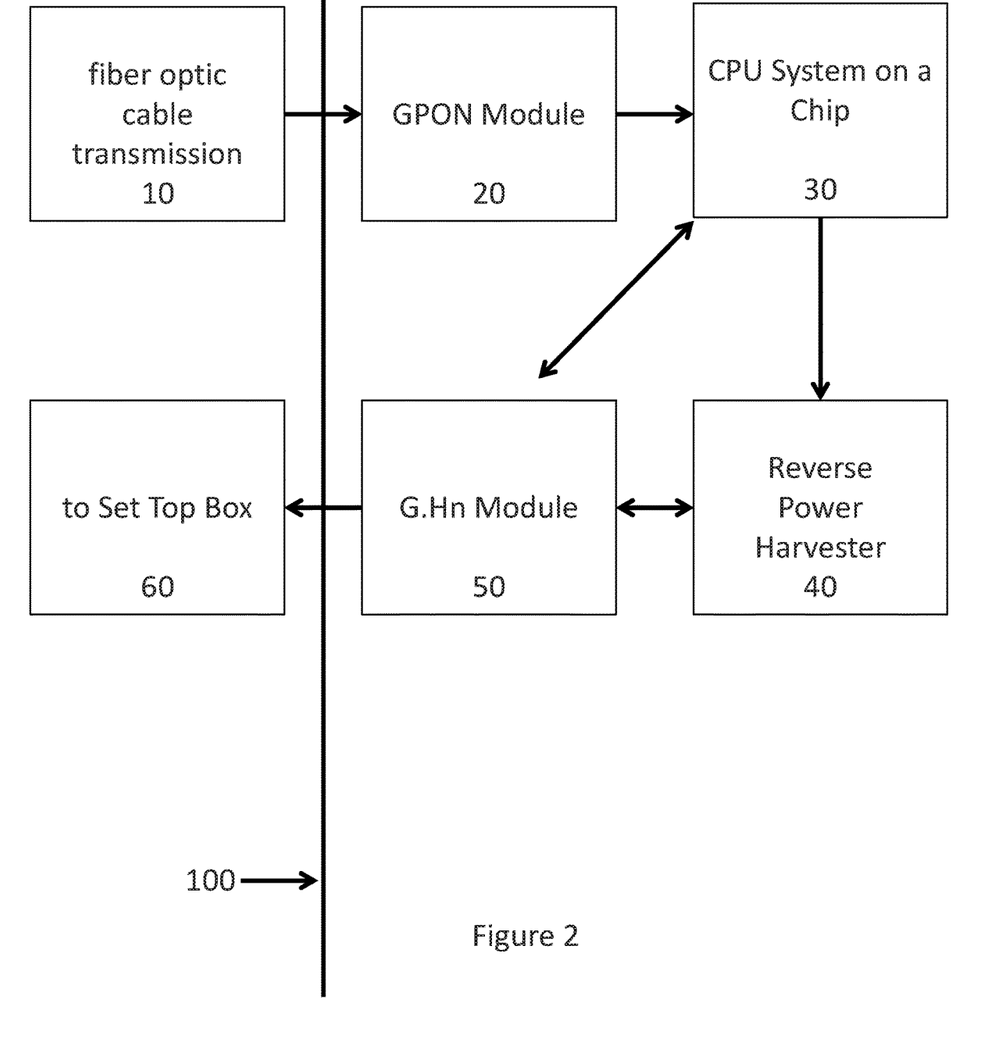
FIG. 2 is a schematic view of the functional components of a DPU of FIG. 1 depicting inputs and outputs.
Figure 3B:
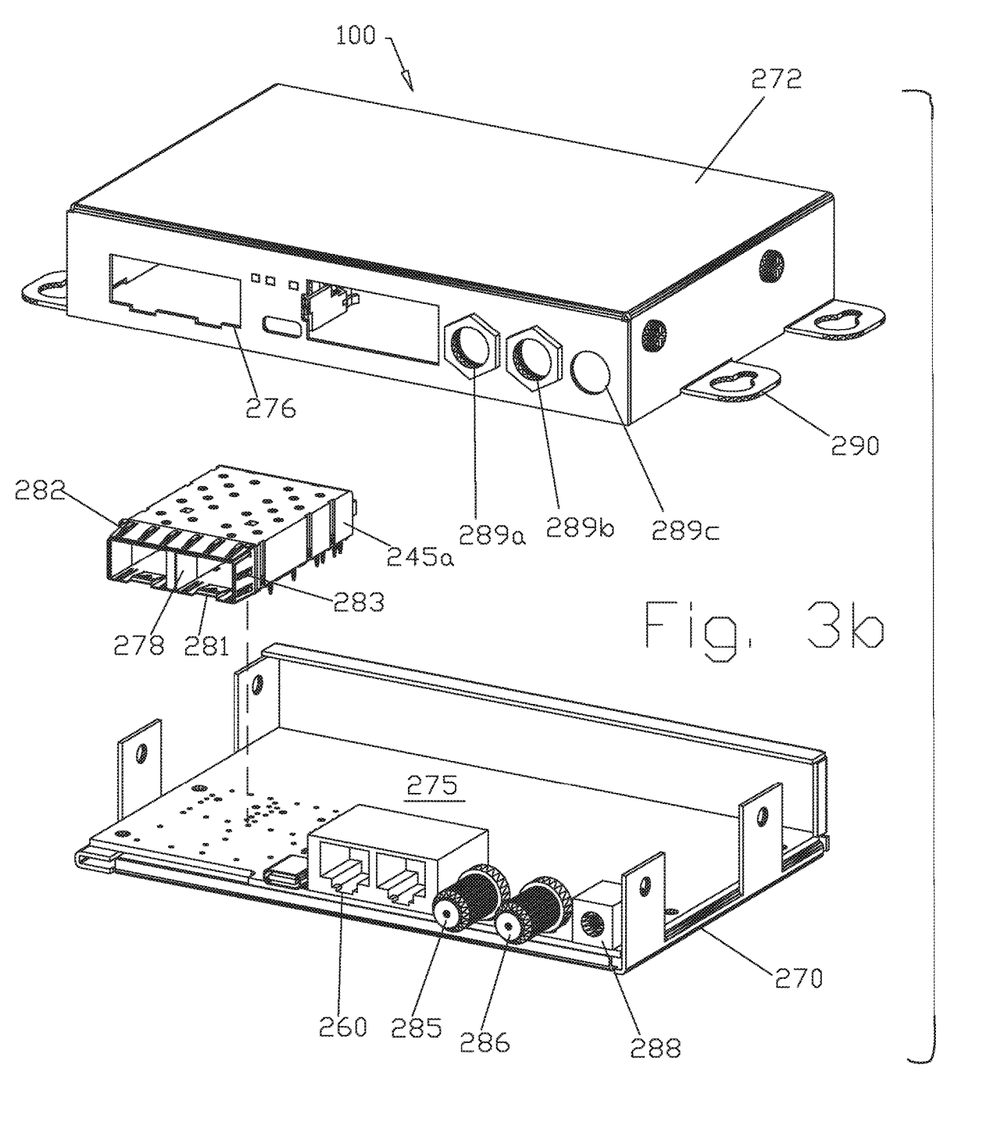
FIG. 3b is an exploded perspective view of the DPU of FIG. 3a depicting the installation of a cage within the DPU.
Figure 4A:
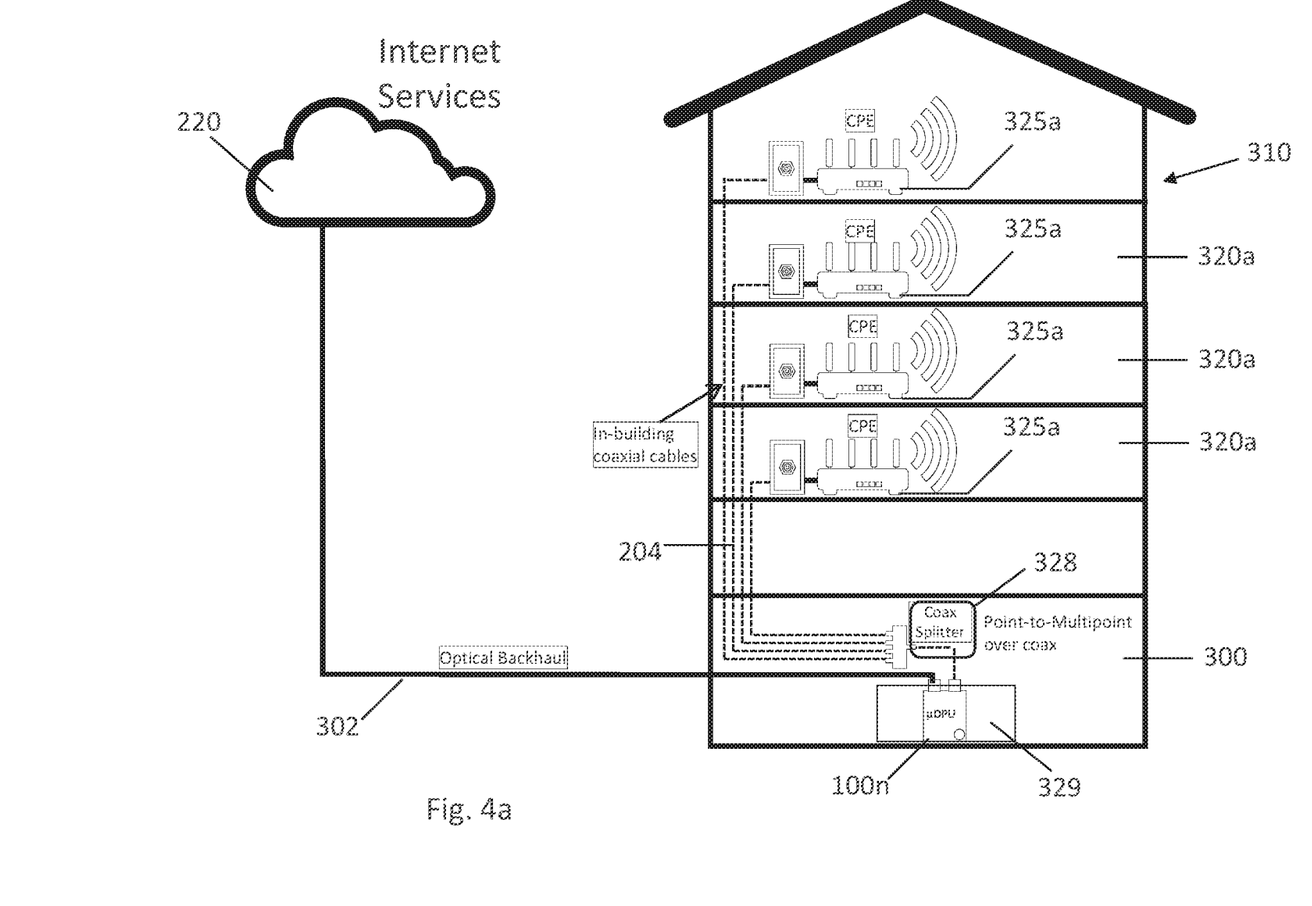
FIG. 4a is a side elevation view of a multi dwelling unit (MDU) where a DPU is installed with a point-to-multipoint coaxial cable wireline service scenario.

FIG. 1 depicts DPU 100 having modular components PON module 240 and HSE module 250. A schematic diagram of the functioning of the DPU 100 is depicted in FIG. 2. A fiber optic cable 10 is connected to the PON or PON ONU/ONT module 20 of the DPU. In an embodiment, a fiber to the curb or fiber to the building deployment is facilitated by a group of DPU nodes stacked together within equipment room 300 or within close proximity to each other mounted directly to a flat surface such as a wall. The DPU includes a port or cage 245 (FIG. 3b) for receiving a Gigabit-capable PON (GPON) module 20. The GPON or GPON ONU/ONT module 20 is connected to a CPU system-on-chip (SoC) 30. The DPU 100 SoC 30 is powered via supplies synthesized from the reverse power harvester 40 as is the High Speed Module (HSE) G.hn Wave-2 module 50. The G.hn Wave-2 module 50 is connected to a CPE 60 in a home, residence or business, such as a gateway 325a (FIG. 4a).

In FIG. 1 the DPU 100 includes a port or cage 245 for receiving a Gigabit PON (GPON) or GPON ONU/ONT module 240 having an SC or LC connector port 243. The GPON or GPON ONU/ONT module 240 is connected to a motherboard 275 that includes a central processing unit (CPU) system-on Chip (SoC) 238. The SoC 238 is powered with various supplies synthesized from the reverse power feed harvester 274 and the SoC 238 is also connected to the high speed electrical (HSE) module 250, such as a G.hn Wave-2 module. The G.hn Wave-2 module 250 may have an RJ-45 connector 265 that is connected via a copper twisted pair cable 204 to a CPE in a home, residence or business. Power is transmitted to the DPU 100 through the primary wireline connector input 206b to the reverse power feed harvester 274 that supplies power to the DPU SoC. Memory is provided to the SoC 238 by a DDR3 295 that provides synchronous dynamic random accessed memory.

Figure 3A:
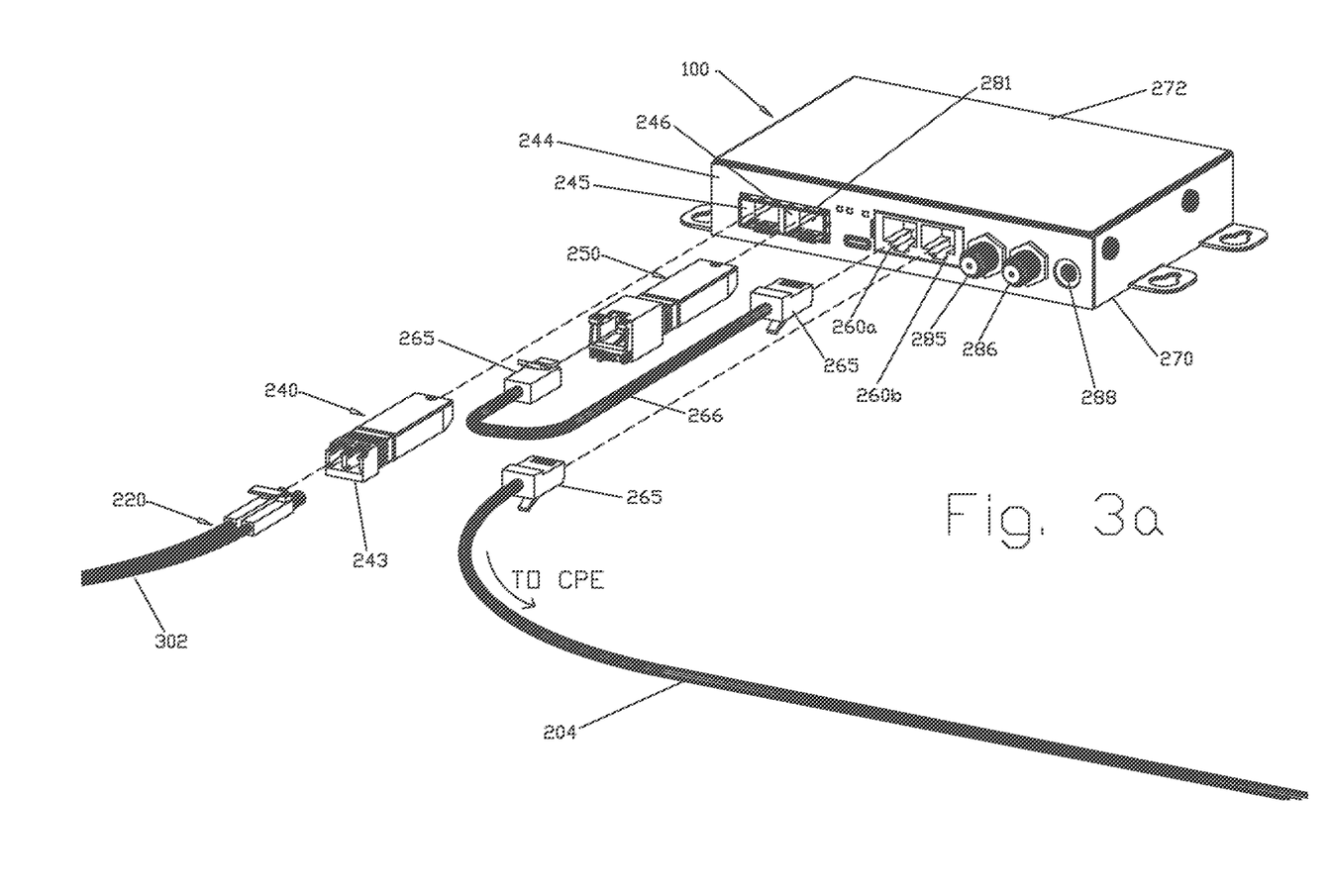
FIG. 3a is a perspective view of a DPU module of the present invention depicting modules and cables to be mated to the DPU

Turning to FIG. 3*a*, an embodiment of a DPU node 100 is depicted having a fiber optic cable and connectors 220 being mated to an optical transceiver 240 having SC or LC receptacles 243. The DPU includes ports 245 for receiving fiber optic or copper transceivers 240, 250. Alternate ports, such as RJ-45 receptacles 260*a, b* are provided by the DPU 100 for receiving RJ-45 plugs 265. In an embodiment, the jumper port 260*a* may receive a loopback cable 266 and standard port 260*b* may receive a copper cable tor broadband transmission to CPE 325*b*. In an embodiment, an SFP optical transceiver 240 may be received in a cage 245 provided by the DPU (FIG. 3*b*). The cage may be constructed according to the teachings of U.S. Pat. No. 7,044,777, which is incorporated by reference herein. In an alternate embodiment, the SFP transceiver may have an F-Type connector for attaching a coaxial cable extended from the CPE of a residence or business premises.

As shown in FIG. 3*b*, the DPU 100 includes a base 270 and housing 272. The base 270 has a motherboard 275 disposed within. The cage 245 is mounted to the motherboard 275. In the embodiment depicted a ganged cage 245 is used having two ports integrally formed. In an alternate embodiment, individual cages having a single port each may be mounted side by side to the motherboard 275. Once the cage 245 is mounted to the motherboard 275, the housing is mounted to the base 270 so that the cage 245 protrudes through port 276. The cage 245 includes guide rails 278 and a connector (not shown) for receiving the male connector of the pluggable modules 240, 250 to be mated within the cage 245. The cage 245 includes grounding tabs 281, 282, 283 for grounding the cage to the port 276. All such components are metallic in an embodiment to facilitate containment of electromagnetic emissions and assist in shielding of the DPU components from the transceivers 240, 250 received within the cage 245. In an embodiment, port 245 receives a PON module 240 and port 246 receives an HSE module 250 (see FIG. 3*a*)

The DPU includes F-Type coaxial connectors 285, 286 and a power receptacle 288. Corresponding ports 289*a, b, c* are provided by the housing 272. Mounting flanges 290 are provided at the sides of the housing 272 so that the DPU may be mounted to an MDU basement wall, an enclosure or a line card in a shelved rack-system, such as a 19-inch rack cabinet, for highest density applications.

Figure 4B:
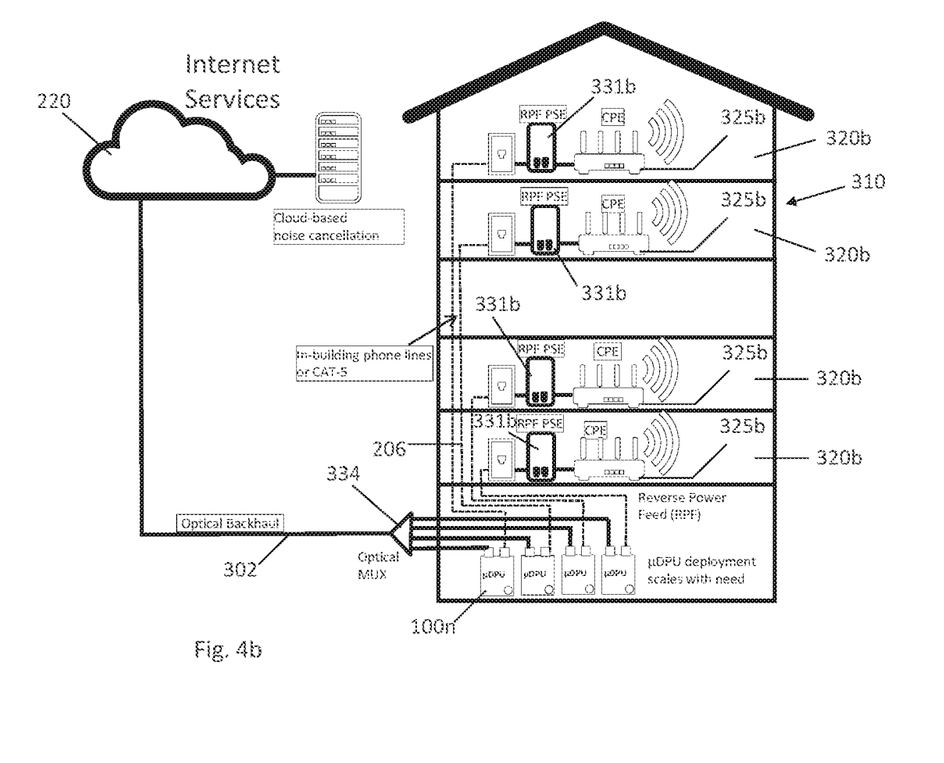
FIG. 4b is a side elevation view of a multi-dwelling unit (MDU) where multiple DPU modules are installed each with a point-to-point twisted pair phone line service connection scenario.

Turning to FIG. 4*b*, multiple DPUs 100*n* are shown in a stacked configuration within an enclosure or mounted in close proximity to each other on a flat surface such as a wall or other flat surface in an equipment room 300. In an embodiment, up to ninety-six DPUs 100*n*, or more, may be ganged or stacked within the enclosure, rack system or equipment room 300 in order to provide broadband services to a corresponding number of residences in the building 310. The equipment room 300 receives a fiber optic cable bundle 302 from the access system optical network or PON. The cable 302 is furcated at its end so that each terminated cable having an SC connector 220 (FIG. 3*a*) is plugged to the receptacle 240 of each DPU 100*n*. In an embodiment, other fiber optic connectors may be used such as LC, FC, ST, or MU and corresponding receptacles are provided by the DPU via the PON module. Such a fiber to the building installation allows for inexpensive deployment of high speed transmissions to individual dwelling units 320*a* within the MDU such as apartment or condominium buildings or individual businesses.

FIG. 4*a* depicts an example of a point-to-multipoint deployment in an MDU where coaxial cable 204 is wired to each individual dwelling 320*a* of the building 310 and is terminated by customer premise equipment (CPE) 325*a*, such as a gateway router or hub. Each cable 204 extends from a coaxial power splitter 328 and connects to each DPU 100*n* within the equipment room 300. In a point-to-multipoint deployment such as that illustrated in FIG. 4*a*, the downstream bandwidth from the PON is shared across the individual dwellings 320*a* within the building 310 thus yielding the lowest possible CAPEX cost to the telecommunications operator for a broadband services deployment.

With respect to FIG. 4*b*, a point-to-point network within a MDU building 310 is depicted. Each DPU 100*n* is connected to a CPE 325*b* of each MDU 320*b* via a copper twisted pair phone line 206. In an embodiment, Category 5, or CAT-5 copper line may be used to connect between the DPU HSE port 246 and the CPE or gateway. In an embodiment, each CPE 325*b* connection is via a reverse power feed (RPF) sourced from an individual dwelling 320*a* equipped with a power source equipment (PSE) 331*b*. Each DPU 100*n* in the MDU receives an optical cable 302 via and optical MUX 334 or some other passive optical splitting means.

So with respect to FIGS. 4*a* and 4*b*, it is indicated that due to the modularity of the DPU 100 of the present invention, the same DPU may be installed for a building regardless of what type of wiring exists in the building. The modularity of the DPU delivers the same deployment flexibility for single family unit (SFU) deployment scenarios where each SFU may receive broadband or ultra-fast broadband service regardless of the copper media already in situ for delivering telephony or digital subscriber line (DSL) services. For a building having coaxial cables connected to CPE 325*a*, the appropriate F-Type connector is provided by the DPU. Likewise, for a building having phone lines connected to CPE 325*b*, the appropriate RJ-45 connector is provided by the DPU. Likewise, if the building is fed using copper lines, the pluggable modules installed in the DPU can be selected with the appropriate copper connector (e.g. F-Type, RJ-45) populating the HSE module port 246 (FIG. 3*a*). As the system is upgraded and fiber is installed in the metropolitan area network, a PON module having a fiber optic input (e.g. SC, LC, FC and MU) connector may be mated to the DPU PON port 245 (FIG. 3*a*). Internet services 220 are connected to the DPUs 100*n*.

In an embodiment, a transceiver 240 includes transmitter circuitry (Tx) to convert electrical data input signals into modulated light signals for transmission over fiber 220. The transceiver 240 may include receiver circuitry (Rx) to convert optical signals received via the fiber 220 into electrical signals and to detect and recover encoded data and/or clock signals. Transceivers can contain communication logic and memory (e.g, a micro controller or CPU and RAM or NVRAM and ROM) for network protocol operation or processing. In another embodiment, transceivers can transmit a same wavelength (e.g., the light signals are polarized and the polarization of light transmitted from one of the transceivers is perpendicular to the polarization of the light transmitted by the other transceiver). In another embodiment, a single wavelength can be used by transceivers (e.g., the transmissions can be made in accordance with a time-division multiplexing scheme or similar protocol). In an embodiment, wavelength-division multiplexing (WDM) can also be used. WDM is herein defined as any technique by which two optical signals having different wavelengths can be simultaneously transmitted bi-directionally with one wavelength used in each direction over a single fiber. In one embodiment, coarse wavelength-division multiplexing (CWDM) or dense wavelength-division multiplexing (DWDM) can be used.

Electrical data input signals (Data IN), as well as any optional clock signal (Data Clock IN), are routed to the transceiver 240 from an external data source such as the internet 220 for processing by the communication logic and memory. Communication logic and memory process the data and clock signals in accordance with a network protocol in-use between transceivers. Communication logic and memory provides management functions for received and transmitted data including queue management (e.g., independent link control) for each respective link, demultiplexing/multiplexing and other functions as described further below. Examples of functions performed at the data link layer include but are not limited to: encapsulating user data into data link layer frames; frame synchronization; forward error correction; data packet queuing, and operation administration and maintenance (DAM) message processing. Data link layer protocols for the client side of PONs 100n can be found in the following protocol specifications: ITU-T G.984 (GPON); IEEE 802.3ah (EPON); ITU-T G.987 (XG-PON); IEEE 802.3av 10 Gigabit Ethernet PON (10G-EPON); ITU Next Generation PON (NG-PON); ITU NG-PON2; WDM-PON; ITU-T G.983 (BPON); Data over Cable Service Interface Specification (DOCSIS) PON (D-PON/DPON), and RFoG SCTE IPS910, as well as any future addendum, annex, normative revision or new version of these protocols for feature, capability or speed enhancements. The SFP module 240, 250 may be compliant with SFF-8472 specification. The module 240, 250 may also be compliant with Multi-Source Agreement for XENPAK, X2, XPAK, XFP, SFP, SFP+, CFP, C-SFP, QSEP, QSFP+ (all of the above herein incorporated by reference).

Figure 5:
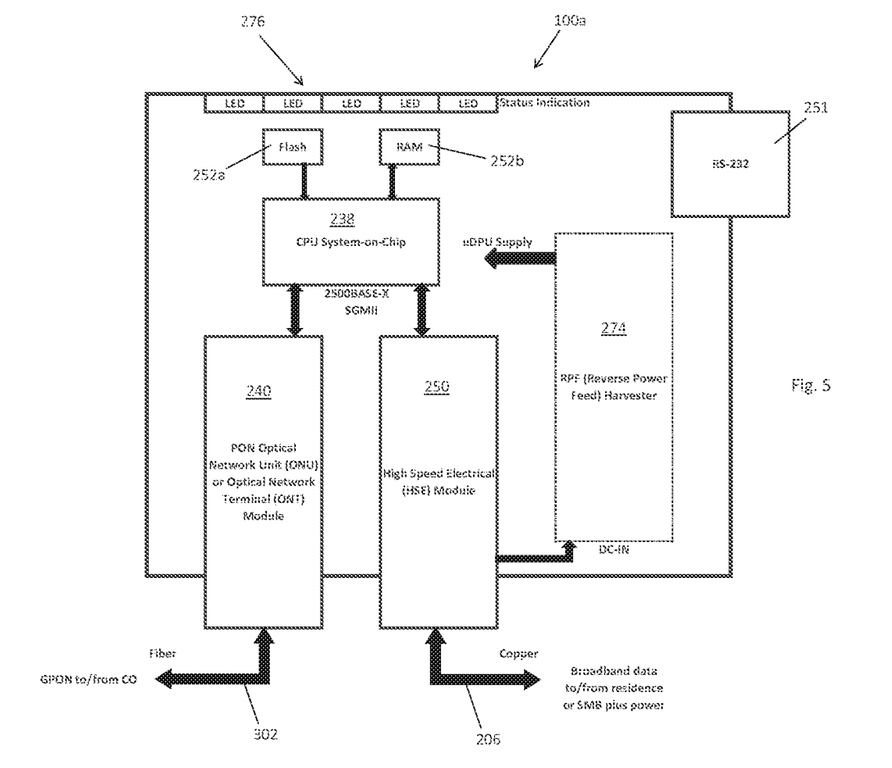
FIG. 5 is a functional block diagram of an alternate embodiment of a modular DPU of the present invention.
Figure 6:
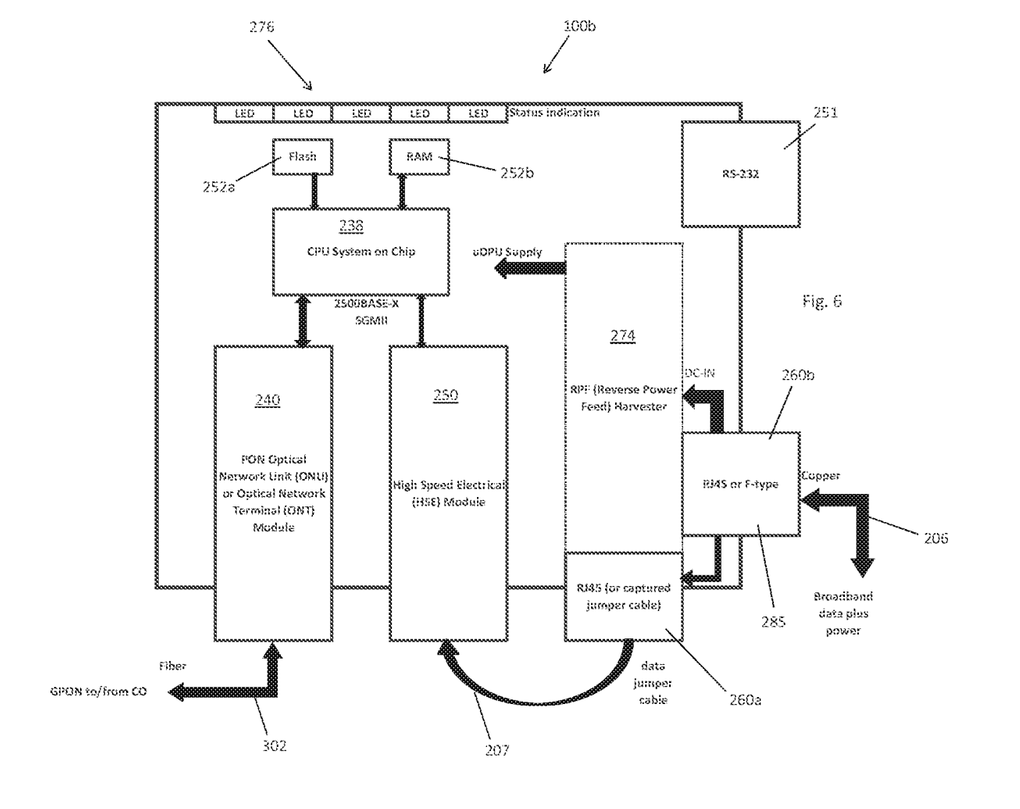
FIG. 6 is a functional block diagram of an alternate embodiment of a semi-modular DPU of the present invention.
Figure 7:
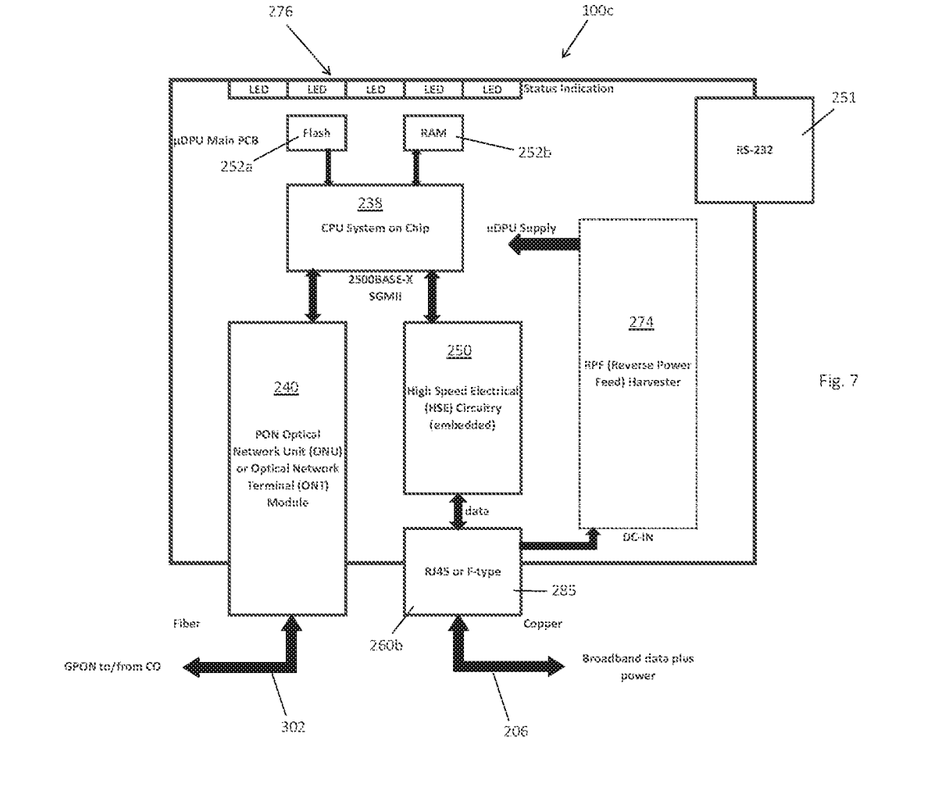
FIG. 7 is a functional block diagram of an alternate embodiment of an embedded DPU of the present invention.

Turning to FIGS. 5-7, modular DPU 100a (FIG. 5), semi-modular DPU 100b (FIG. 6) and embedded DPU 100c (FIG. 7) DPU embodiments are depicted. The modular DPU embodiment 100a provides the highest degree of DPU flexibility because it includes fully modular PON module 240 and HSE module 250 to extend broadband service delivery to the customer via existing copper cables connected directly to the HSE module 250 (no supplemental RJ-45 or F-Type connectors provided elsewhere on the DPU 100a). The semi-modular DPU embodiment 100b provides flexibility comparable to DPU 100a because it provides supplemental RJ-45 and F-Type connectors for broadband data transmission via copper cables 206 and a jumper cable 207 link to the HSE module 250, however the HSE module 250 of DPU 100b lacks the DC-power splitter embedded in the HSE module 250 embodiment of DPU 100a. The embedded DPU embodiment 100c provides limited flexibility because the HSE module 250 is embedded on the motherboard 275 and is not pluggable and handles broadband transmission via embedded RJ-45 or F-Type connectors also mounted to the motherboard 275. However, the DPU embodiment of 100c represents the lowest relative cost between the three variants; DPU 100a, DPU 100b and DPU 100c.

Turning to FIG. 5, the modular DPU embodiment is depicted. The key component that provides modularity is the high speed electrical (HSE) module 250, such as a wireline SFP that receives a copper input 206 of upstream broadband data from a residence 320a or enterprise plus power from a reverse power feed injector or power source equipment (PSE) 331b. By contrast, the embedded DPU embodiment 100c depicted in FIG. 7, comprises an RJ-45 260b or F-Type copper connector 285 embedded with the DPU 100c and connected to the HSE circuitry 250 embedded into the motherboard 275. With respect to the semi-modular DPU embodiment 100b depicted in FIG. 6, it comprises RJ-45 connectors 260a connected to the reverse power harvester circuitry 274 with a jumper cable 207 attached to the USE module 250, such as a wireline SFP. The broadband data to/from a residence 320a or enterprise is connected to the USE module 250 via jumper cable 207 to the embedded RJ-45 connector 260b. These alternate components define the varying levels of modularity of the present DPU 100 invention.

The remaining components of the DPU 100 embodiments depicted in FIGS. 5-7, are identical. Each include a pluggable PON or PON ONU/ONT module 240, such as an SFP that receives a fiber optic cable connector 220 extending to and from a central office (CO) or digital subscriber line access multiplexer (DSLAM) 302 (FIG. 4a). The PON or PON ONU/ONT module 240 connects to a CPI system on a chip (SoC) 238 on a motherboard 275 of the DPU 100 (FIG. 3b). The CPU SoC 238 is connected to a Flash memory 252a and RAM 252b (FIG. 1). The CPU SoC 238 receives power from Reverse Power Feed (RPF) circuitry 274. The CPU SoC 238 may run an OpenWRT embedded OS with Linux kernel and may include supporting circuitry to manage data layer packet forwarding between downlink 250 and uplink 240 interfaces and to run a management client. Temperature sensor 254 (FIG. 1) may monitor the temperature of the DPU 100 internal electronics. The DPU 100 may also include RS-232 circuitry 251 and a group of LEDs 276 to communicate operational functionality of the DPU 100.

In an embodiment as depicted in FIGS. 3a, b, the DPU housing 270, 272 may be implemented in a material capable of dissipating upward of 10 W power, such as aluminum or stainless steel. The DPU housing 270, 272, dimensions may be approximately 33.5" (90 mm) deep×6.7" (170 mm) wide×0.9" (23 mm) tall. The DPU housing 270, 272 may include features that allow it to be conveniently mounted in a variety of different deployment applications including being attached to a heat spreader plate 329 (FIG. 4a). This heat spreader plate 329 may be used as a supplemental means for thermal management in non-IP67/68 enclosure deployments but is required when the DPU 100 is mounted inside an environmentally sealed, ingress protected IP67/68 rated enclosure. Such an enclosure may be modified to include a metal heat transfer plate for the DPU 100 to be mounted to.

All connectivity and status indication for the DPU 100 may be arranged along one edge 244 of the unit 100 to facilitate access when cabling during installation and visibility for inspection and service. The DPU 100 may be reverse powered using the phone line twisted pair 206 (FIG. 4b) or coax cable 204 (FIG. 4a) that connects between the DPU 100 and customer premises 320a, b. Reverse power feed 274 may comply to the requirements of ETSI TS 101 548. The DPU 100 may comply to SR2 Power Class; ≤10.9 W drawn at the input of the powered device (PD) 274 at the end of up to 150 m of phone line twisted pair 206.

The reverse power feed or so called powered device (PD) harvester 274 may make available in the order of 10 W of power, after losses and conversion efficiency, available to the DPU circuitry, including downstream and upstream SFP modules 240, 250 fitted in the DPU 100. The DPU 100 may support power good status (PGS) and Dying Gasp (DG). The DG signal may be routed upstream to the PON interface optical transceiver module 240 for communication back to the central office (CO). The power feed harvester 274 may include system power supplies 280. A surge protection and RPF power splitter 277 is linked to the power feed harvester or powered device 274.

The DPU 100 may support the option for local power from a 14V DC, or greater, 20 W rated wall plug AC-DC adapter 234. The DPU 100 may include a 2.5 mm diameter center positive, input barrel connector 288 for a 14V DC, or greater, 20 W rated local power connection. The DPU 100 may support LED indication 276 to show power source being used, either RPF or local power. The DPU 100 LED indication 276 may also show the overall status of the DPU 100 and corresponding optical and wireline connections to and from the unit as well as alarm status.

The DPU 100 may provide a cage 245 and support circuitry for an upstream optical SFP module 240 specifically a GPON or GPON ONU/ONT SFP. The SFP module host circuitry will comply with the requirements of INF-9074i, specification for SFP (Small Form-factor Pluggable) Transceiver 240, 250. The DPU 100 may provide a cage 245 and support circuitry for a downstream copper SFP module 250 for the following technologies and copper cable configurations: Single-in Single-out (SISO) phone line G.now Wave-2, Multiple-In, Multiple-Out (MIMO) phone line G.now Wave-2, Gfast phone line, bonded Gfast phone line, Ethernet NBASE-T for Cat-5/6 cable, Ethernet 10/100BASE-T for Cat-5/6 cable, Ethernet 10000BASE-T for Cat-5/6 cable and Ethernet 10GBASE-T for Cat-6/6a cable.

The DPU 100 may include a pair of F-type connectors 285, 286 for coaxial cable installations. One of the F-types 286 may be defined for connecting to the premises cabling 204, 206 that includes both reverse power feed (RPF) DC voltage and broadband data. The other F-type connector 285 may be used for looping the separated broadband data to the input of the corresponding wireline downlink SFP 250 after the RPF DC voltage has been tapped for the RPF harvester circuit 274.

The DPU 100 may include a pair of RJ-45 connectors 260 for phone line and CAT-5/6 installations. One of the RJ-45s 260b may be defined for connecting to the premises cabling 206 that includes both RPF DC voltage and broadband data. The other RJ-45 connector 260a may be used for looping the separated broadband data to the input of the corresponding wireline downlink SFP 250 after the reverse power feed (RPF) DC voltage has been tapped for the RPF harvester circuit 274. The DPU 100 may include a standard USB 2.0 port with a Type-C connector interface for the purpose of local communication with the DPU 100 necessary during installation.

The DPU 100 may include a header pin array interface internal to the unit connected to the CPU system-on-chip (SoC) interface 238 for the purpose of communication to the SOC 238 necessary during unit bring-up or during de-bug and diagnostics.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

The invention claimed is:

1. A distribution point unit (DPU) comprising:
a passive optical network (PON) module;
a high speed electrical (HSE) module;
the DPU having a reverse power harvester connected to the HSE module, the DPU receiving optical signals via the PON module and the PON module converting the optical signals to electric signals, the HSE module and PON module each transmitting electrical signals to a system-on-chip (SoC) having a central processing unit (CPU);
the CPU runs an embedded operating system for network interface and management, the CPU to manage data layer packet forwarding between downlink and uplink interfaces, wherein the HSE module is the downlink interface and the PON module is the uplink interface and the HSE module is mated within a modular port of the DPU; and
the SoC providing control and feedback for the HSE module, the HSE module using a G.hn wireline interface wherein the SoC runs an embedded operating system and an IPv4/v6 host management stack for network interface and management between the HSE downlink interface and the PON uplink interface.

2. The DPU of claim 1 wherein the HSE module is compliant with one of a G.hn, VDSL/VDSL2, Gfast and Ethernet technology.

3. The DPU of claim 1 wherein the DPU is mounted within the reach limits of the HSE module wireline technology and the PON module receives optical input via one of an SC, LC, FC and MU connector plug.

4. The DPU of claim 1 wherein the PON module is compliant with one of one of GPON, XG-PON, XGS-PON and NG-PON2.

5. The DPU of claim 1, wherein the DPU includes a receptacle having a cage for receiving the PON module that is compliant with one of an SFP, SFP+, QSFP, QSFP+ and XFP multi-source agreement.

6. The DPU of claim 1 wherein multiple DPUs are stacked within an enclosure, rack system or arranged in close proximity on a flat surface including a wall, providing high speed interconnections to customer premises of up to 96 residences.

7. The DPU of claim 1 wherein the DPU uses transmissions from a wireline interface and provides broadband transmissions of 1 Gbps or greater to customer premises equipment.

8. The DPU of claim 1 comprising a system-on-chip (SoC) providing control and feedback for multiple PON and HSE modules, each PON and HSE module mated within a modular port of the DPU.

9. The DPU of claim 1 wherein the operating system consists of a Linux operating system.

10. A distribution point unit (DPU) comprising:
a passive optical network (PON) module and a high speed electrical (HSE) module, the HSE module using a G.hn interface;
the DPU receiving optical signals via the PON module and converting to electrical signals, the HSE module transmitting the electrical signals to a customer premises equipment (CPE) within a single family home or building or a multi-dwelling unit; and
the DPU comprising a system-on-chip (SoC) having a central processing unit (CPU) providing control and feedback for the PON or HSE modules wherein the SoC runs an embedded operating system for network interface and management, downlink or uplink modules are mated to the DPU and each of the HSE and PON modules are connected to the CPU wherein the SoC runs an IPv4/v6 host management stack for network interface and management between HSE downlink interface and a PON uplink interface.

11. The DPU of claim 10 wherein the PON module is compliant with one of protocol specifications: ITU-T G.984 (GPON); IEEE 802.3ah (EPON); ITU-T G.987 (XG-PON); IEEE 802.3av 10 Gigabit Ethernet PON (10G-EPON); ITU-T G.989 Next Generation PON (NG-PON2); ITU-T G.983 (BPON); and SCTE Standard SCTE 174 2018 (RFoG).

12. The DPU of claim 10 including crosstalk compensation supported between co-located DPUs.

13. The DPU of claim 10 wherein each DPU has four channels per DPU.

14. The DPU of claim 10 including a receptacle for receiving a module that is compliant with one of an SFP, SFP+, QSFP, QSFP+ and XFP multi-source agreement.

15. The DPU of claim 10 wherein the DPU is locally powered by DC voltage.

16. The DPU of claim 10 wherein the operating system consists of a Linux operating system.

17. A distribution point unit (DPU) comprising:
a high speed electric (HSE) module; and
the DPU having a system-on-chip (SoC) providing control and feedback for an HSE transceiver module mated within a modular port of the DPU, the HSE module transmitting electrical signals to the SoC, the HSE module using a G.hn wireline interface, wherein the SoC runs an embedded operating system and an IPv4/v6 stack for network interface and management between HSE downlink interface and a PON uplink interface.

18. The DPU of claim 17 wherein the HSE module includes G.hn Wave-2 wireline PHY circuitry.

19. The DPU of claim 17 including a receptacle for receiving a transceiver module that is compliant with one of an SFP, SFP+, QSFP, QSFP+ and XFP multi-source agreement.

20. The DPU of claim 17 including circuitry to manage data plane packet forwarding between downlink and uplink interfaces wherein the HSE module is the downlink interface and a PON module is the uplink interface.

21. The DPU of claim 20 including a Linux operating system for network interface and management.

22. The DPU of claim 20 wherein the DPU is locally powered by DC voltage.

* * * * *